(12) United States Patent
Friedrich et al.

(10) Patent No.: US 12,188,509 B2
(45) Date of Patent: Jan. 7, 2025

(54) PIN

(71) Applicant: A. RAYMOND ET CIE, Grenoble (FR)

(72) Inventors: Christian Friedrich, Los Osos, CA (US); Antoine Le Gall, Fontaine (FR)

(73) Assignee: A. Raymond et Cie, Grenoble (FR)

( * ) Notice: Subject to any disclaimer, the term of this patent is extended or adjusted under 35 U.S.C. 154(b) by 679 days.

(21) Appl. No.: 17/308,296

(22) Filed: May 5, 2021

(65) Prior Publication Data

US 2021/0348633 A1 Nov. 11, 2021

Related U.S. Application Data

(60) Provisional application No. 63/020,856, filed on May 6, 2020.

(30) Foreign Application Priority Data

May 12, 2020 (FR) ........................... 2004660

(51) Int. Cl.
*F16B 3/00* (2006.01)
*H02S 30/10* (2014.01)

(52) U.S. Cl.
CPC ................ *F16B 3/00* (2013.01); *H02S 30/10* (2014.12); *Y10T 403/75* (2015.01)

(58) Field of Classification Search
CPC .... F16B 2/24; F16B 2/241; F16B 3/00; F16B 7/0433; F16B 21/12; F16B 21/125;
(Continued)

(56) References Cited

U.S. PATENT DOCUMENTS 3,922,764 A * 12/1975 Downing, Jr. ............ E04B 2/74
24/350
4,922,587 A 5/1990 Pettit
(Continued)

FOREIGN PATENT DOCUMENTS

| DE | 3518866 C1 | 11/1986 |
| EP | 0458126 A2 | 11/1991 |
| GB | 264933 | 1/1927 |

OTHER PUBLICATIONS

"What is Tempered Steel?" One Monroe. Aug. 10, 2019, [online], [retreived on Aug. 3, 2024] Retreived from the Internet <URL:https://www.monroeengineering.com/blog/what-is-tempered-steel/>.*
(Continued)

*Primary Examiner* — Josh Skroupa
*Assistant Examiner* — Kevin J Baynes
(74) *Attorney, Agent, or Firm* — TraskBritt

(57) ABSTRACT

A pin comprises a metal body extending along a longitudinal insertion axis (Ox) and has a first and a second end along the longitudinal axis (Ox), an upper face and a lower face opposite the upper face. The pin has two convex portions each having an inclined inner wall and an inclined outer wall, the inclined walls of each convex portion forming a ridge and extending along the longitudinal axis. At least one ridge has on its lower face a protruding blade obtained by cutting and folding the metal body along the longitudinal axis. A concave portion of the pin connects the inner walls of each convex portion via a central surface. The pin has at least one blocking member.

14 Claims, 5 Drawing Sheets

(58) Field of Classification Search
CPC ........ F16B 2/20; Y10T 403/30; Y10T 403/60; Y10T 403/7018; Y10T 403/7123; Y10T 403/7129; Y10T 403/7135; Y10T 403/75; Y10T 24/44026; Y10T 24/44983; E04H 17/055; E04H 17/20; F16M 2200/028; H02S 30/10; F24S 25/20; F24S 25/60; F24S 2025/80
USPC ............... 403/380; 52/698, 699, 703, 713
See application file for complete search history.

(56) References Cited

U.S. PATENT DOCUMENTS

| | | | |
|---|---|---|---|
| 5,211,521 A * | 5/1993 | Page | F16B 5/0642 411/182 |
| 6,353,981 B1 * | 3/2002 | Smith | F16B 2/241 24/295 |
| 7,415,752 B2 * | 8/2008 | De Azevedo | F16B 2/24 24/295 |
| 8,250,827 B2 * | 8/2012 | Lin | E04B 1/2612 52/289 |
| 8,590,223 B2 * | 11/2013 | Kilgore | H02S 20/10 52/173.3 |
| 9,850,934 B2 * | 12/2017 | Schulz | F16B 2/243 |
| 10,530,293 B2 * | 1/2020 | Legall | H02S 30/10 |
| 11,552,590 B2 * | 1/2023 | Cavieres Pinilla | F16B 2/243 |
| 2006/0102820 A1 * | 5/2006 | Boville | F16B 2/245 248/300 |
| 2011/0100435 A1 | 5/2011 | Ogasahara et al. | |

OTHER PUBLICATIONS

European Extended Search Report and Opinion for European Application No. 21168609, dated Sep. 22, 2021, 5 pages (Original Document Only).

* cited by examiner

PIN

CROSS-REFERENCE TO RELATED APPLICATIONS

This application claims priority to French Patent Application No. FR2004660 filed May 12, 2020, which claims the benefit under 35 U.S.C. § 119(e) of U.S. Provisional Patent Application Ser. No. 63/020,856, filed May 6, 2020, the disclosure of each of which is hereby incorporated herein in its entirety by this reference.

TECHNICAL FIELD

The present invention relates to a pin, in particular for retaining elements in a rail. It is more particularly used to secure the frame of a photovoltaic module in a rail of a supporting structure.

BACKGROUND

Currently, more than 90% of photovoltaic modules include an aluminum frame that makes it possible to provide rigidity to the modules constructed from an assembly consisting of a glass plate on the front face (exposed to the sun) and a plastic sheet (TEDLAR®) on the rear face. Another advantage of a metal frame of this kind is to facilitate the mechanical securing of a photovoltaic module on a metal rail, generally made of steel, of a supporting structure. The supporting structure may, for example, be intended to be secured to the roof of a house.

When securing the metal frame of the photovoltaic module on the rail of the supporting structure, it must be taken into account that, once installed, the module may be subjected to significant loading, for example from the forces exerted by the wind, in particular the module being pulled out of the rail, thus tending to separate the frame of the module from the supporting structure. Whatever the conditions to which a module is subjected, it is necessary to prevent the frame from unintentionally detaching from the supporting structure. It is also necessary to maintain uninterrupted electrical contact between the module and the supporting structure in order to keep the assembly at an electrical ground.

It is all the more important to take the stresses into account if the supporting structure is associated with a mobile device that makes it possible to optimally orient the photovoltaic modules depending on the position of the sun, or of any other circumstance. In particular, the inclination of the modules causes them to bend, which induces significant stresses on the device for securing the module to the rail in the direction orthogonal to the pull-out direction, which can cause the securing device to slide and disengage, and therefore cause the module to separate from the supporting structure.

Document GB264933 discloses nails, staples, spikes, hooks, brads and brobs made or cut from sheets or strips of metal. These components have a shank portion that is folded or curved lengthwise and so that after folding, curving or bending, they have an "S," "U," "V," "C," or any other curved or angular shape in cross-section. The fasteners proposed by this document may not be suitable for securing the frame of a photovoltaic module in a rail of a supporting structure, at least in some circumstances.

BRIEF SUMMARY

The present disclosure aims to resolve the aforementioned problems at least in part by proposing a solution that, in particular, allows simple and fast securing of elements in a rail in order to form an assembly having a high resistance to the various aforementioned stresses and loading and that makes it possible to maintain continuous electrical contact between the elements and the rail.

With a view to achieving this aim, the object of the disclosure is to provide a pin comprising a metal body extending along a longitudinal insertion axis (Ox) and having a first and a second end along the longitudinal axis (Ox), an upper face and a lower face opposite the upper face. The pin comprises:

two convex portions each having an inclined inner wall and an inclined outer wall, the inclined walls of each convex portion forming a ridge and extending along the longitudinal axis, at least one ridge having on its lower face a protruding blade obtained by cutting and folding the metal body along the longitudinal axis;
  a concave portion connecting the inner walls of each convex portion via a central surface; and
  at least one blocking member.

According to other advantageous and non-limiting features of the disclosure, considered in isolation or in any technically feasible combination:

each outer wall continues along a transverse axis (Oz) by means of a wing that is substantially parallel to the central surface;
  at least one wing has a shoulder along the transverse axis (Oz), the shoulder being located between the second end and the at least one blocking member;
  the at least one blocking member is formed by a projecting rib on the upper face, obtained by cutting and folding the metal body along a transverse axis (Oz);
  the at least one blocking member is formed by a lug extending outwardly along a transverse axis (Oz);
  the lug is folded back toward the lower face;
  the pin comprises a blocking member on each wing, the blocking members being aligned on a transverse axis (Oz);
  the at least one blocking member is formed by a projecting rib on the inclined outer wall, obtained by cutting and folding the metal body;
  the pin comprises at least one protruding blade on the ridge of each convex portion;
  the pin comprises two protruding blades aligned along the longitudinal axis (Ox) on the ridge of each convex portion;
  the pin comprises exactly one protruding blade on the ridge of each convex portion, the protruding blades being offset with respect to one another along the longitudinal axis (Ox);
  each ridge has a plateau, each protruding blade being cut in only part of the width along a transverse axis (Oz) of the plateau;
  the first end having a beveled shape;
  the pin comprises a non-return notch formed on the lower face or on the upper face;
  the metal body is made of tempered steel; and/or
  each wall has a hole, which holes face one another along a transverse axis and are arranged between the first end and the at least one protruding blade, the at least one blocking member comprising a rod capable of passing through all the holes.

The present disclosure also relates to the use of a pin as presented above to retain two elements in a U-shaped rail that extends along a transverse axis (Oz), the rail having a closed horizontal side, an open horizontal side for receiving the elements in a retaining position and two side walls that are extended opposite the closed side by means of a horizontal wall extending outward from the rail along the longitudinal axis (Ox), each side wall having an opening, which openings face one another along the longitudinal axis (Ox) and each extend in part along the horizontal wall, each element having a through-passage located opposite the openings when the element is in the retaining position, such that the pin is inserted along the longitudinal axis (Ox) in the openings and through-passages into an assembly position in which the at least one protruding blade and the at least one blocking member have passed through at least a first opening of the rail, the at least one protruding blade coming into forced contact with the elements, the at least one blocking member forming a stop against the rail to prevent removal of the pin.

The present disclosure also relates to the use of a pin as presented above to retain two elements in a U-shaped rail that extends along a transverse axis (Oz), the rail having a closed horizontal side, an open horizontal side for receiving the elements in a retaining position and two side walls that are extended opposite the closed side by means of a horizontal wall extending outward from the rail along the longitudinal axis (Ox), each side wall having an opening, which openings face one another along the longitudinal axis (Ox) and each extend in part along the horizontal wall, each element having a through-passage located opposite the openings when the element is in the retaining position, such that the pin is inserted along the longitudinal axis (Ox) in the openings and through-passages into an assembly position in which the at least one protruding blade and the holes have passed through a second opening of the rail, the at least one protruding blade coming into forced contact with the elements, the at least one blocking member being inserted in the holes to prevent removal of the pin.

BRIEF DESCRIPTION OF THE DRAWINGS

Other features and advantages of the disclosure will become apparent from the following detailed description of embodiments of the disclosure, which is provided with reference to the appended drawings, in which.

DETAILED DESCRIPTION

Figure 1A:
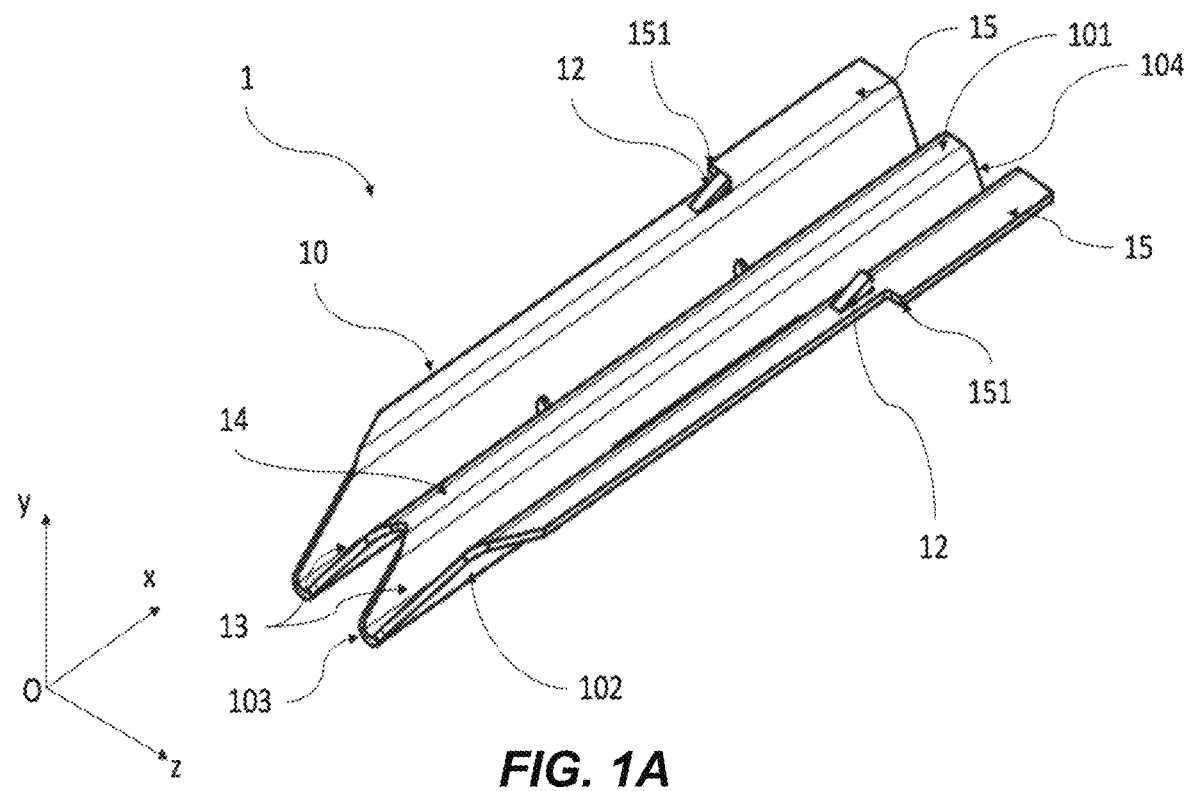
FIGS. 1A-1D show, respectively, an isometric view, a side view along a plane orthogonal to the transverse axis, a side view along a plane orthogonal to the longitudinal axis and a view from below of a pin according to a first embodiment of the present disclosure.
Figure 1B:
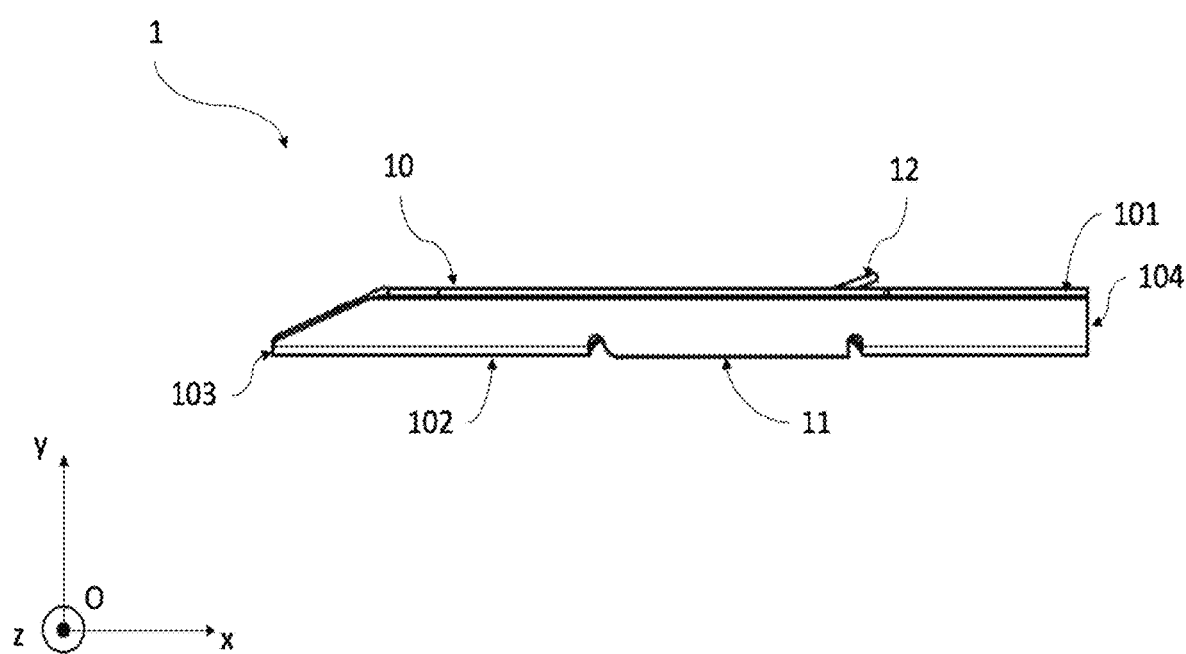

For the sake of simplifying the following description, the same reference signs are used for elements which are identical or perform the same function in the different embodiments of the present disclosure.

In general, the disclosure relates to a pin that makes it possible to retain two elements, such as the metal frames of a photovoltaic module, in a U-shaped rail, for example the rail of a metal supporting structure. To do this, the pin is intended to be inserted along a longitudinal insertion axis into openings made in side walls of the rail and into a through-passage in each element. This assembly makes it possible to secure the frames in the rail of the structure and also to maintain continuous electrical contact between the photovoltaic module and the supporting structure.

General Structure of the Pin

FIGS. 1A to 1D and 2A to 2D show different views of two embodiments of a pin according to the disclosure. An orthogonal coordinate system Oxyz is shown therein, comprising a longitudinal axis (Ox), a vertical axis (Oy) and a transverse axis (Oz).

In general, a pin 1 of this kind comprises a metal body 10 extending along a longitudinal insertion axis (Ox). The metal body 10 has an upper face 101 and a lower face 102 opposite the upper face 101. The metal body 10 also has a first end 103 and a second end 104 along the longitudinal axis (Ox).

The metal body 10 consists of a metal strip cut and then folded, for example by means of stamping using a follow-on machine.

The material of the metal body 10 is advantageously tempered steel, the shape of which is cold-formed before thermal tempering is carried out at 800° C., for example. The steel can then be protected against corrosion by means of a surface treatment step. The choice of such a material is particularly advantageous in that it allows for easy shaping before tempering, and then, after tempering, high mechanical strength and resilience.

In general, the pin 1 has a cross-section in a plane orthogonal to the longitudinal axis (Ox) in the form of a W when the upper face is turned upward.

This shape gives the pin 1 flexibility while minimizing the amount of material required. This shape makes it possible, in particular, to have greater flexibility than a rectangular or U-shaped part.

Figure 1C:
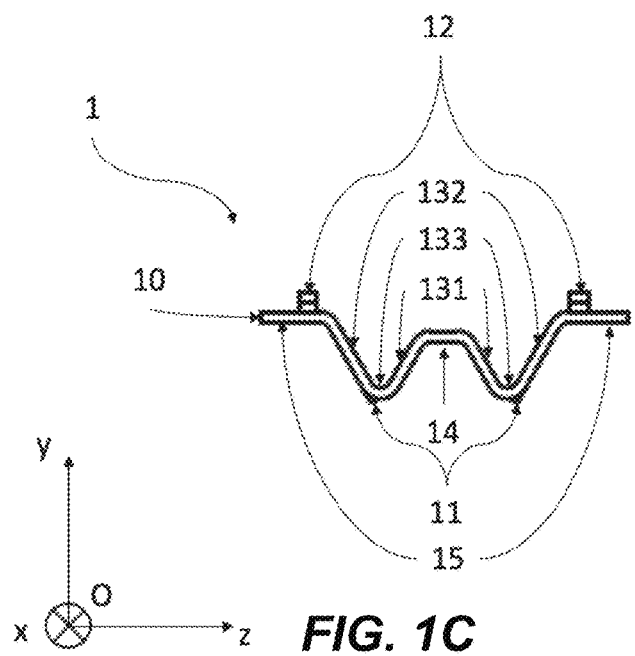
Figure 1D:
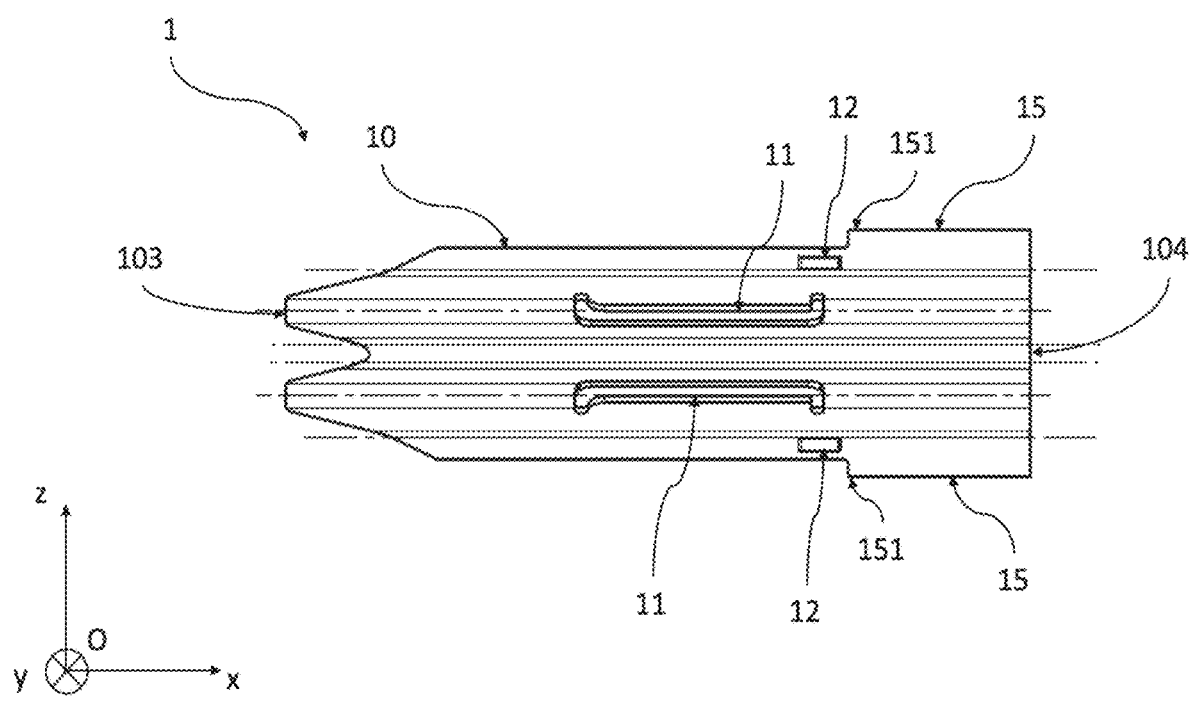
Figure 2A:
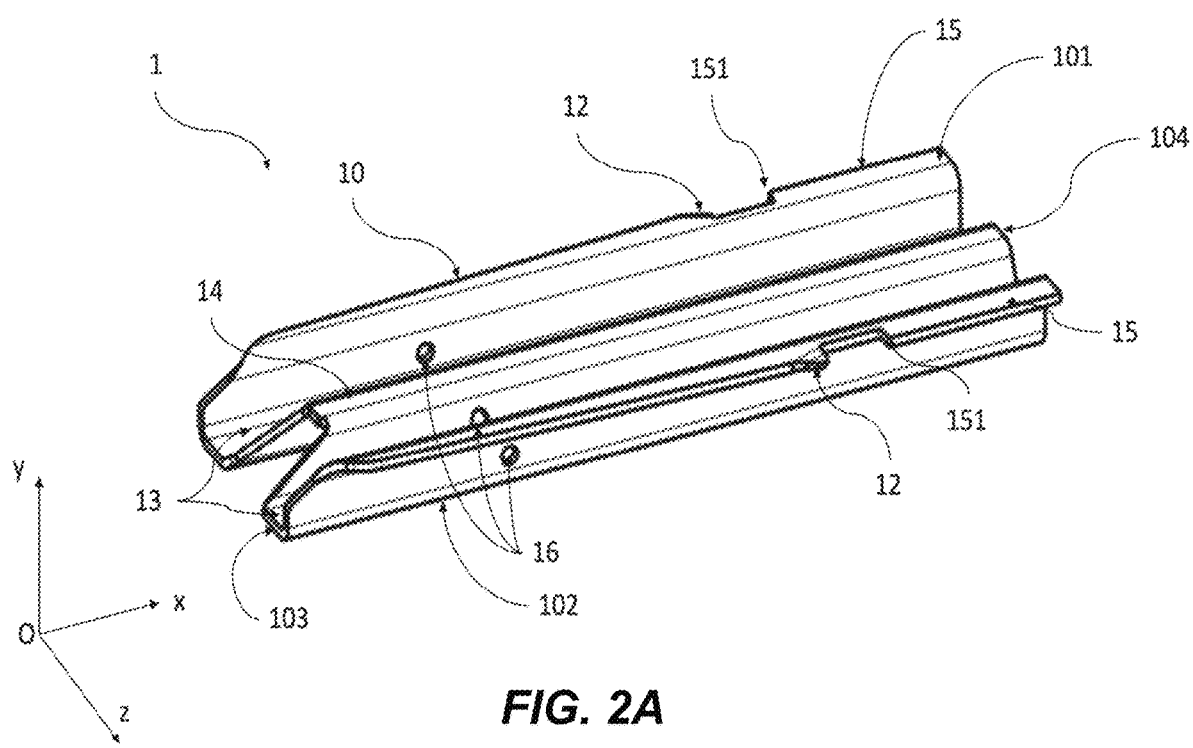
FIGS. 2A-2D show, respectively, an isometric view, a side view along a plane orthogonal to the transverse axis, a side view along a plane orthogonal to the longitudinal axis and a view from below of a pin according to a second embodiment of the present disclosure.
Figure 2B:
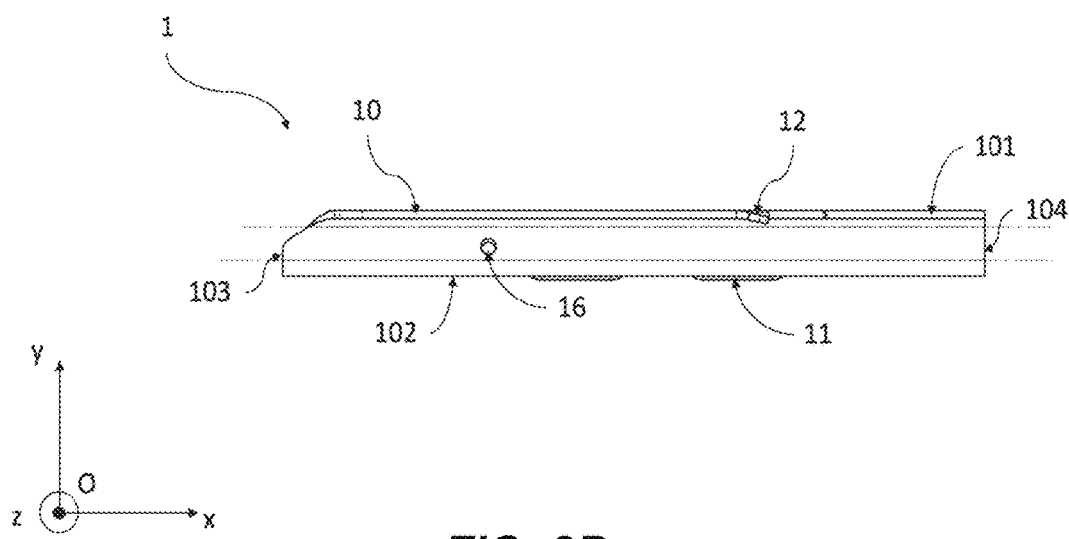
Figure 2C:
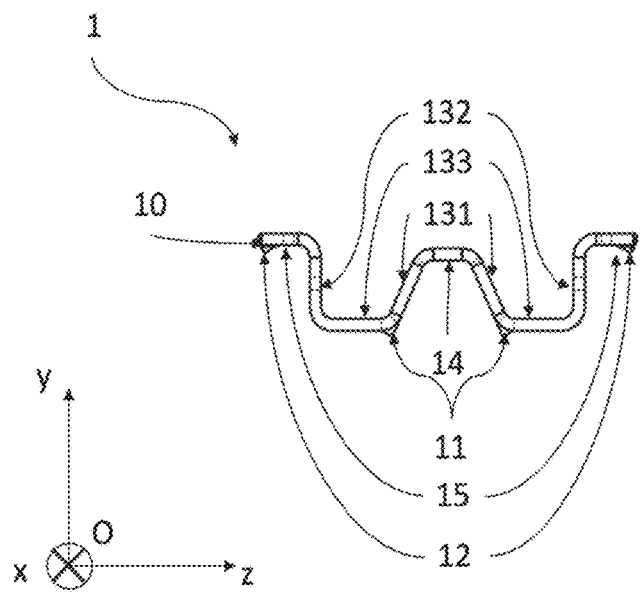
Figure 2D:
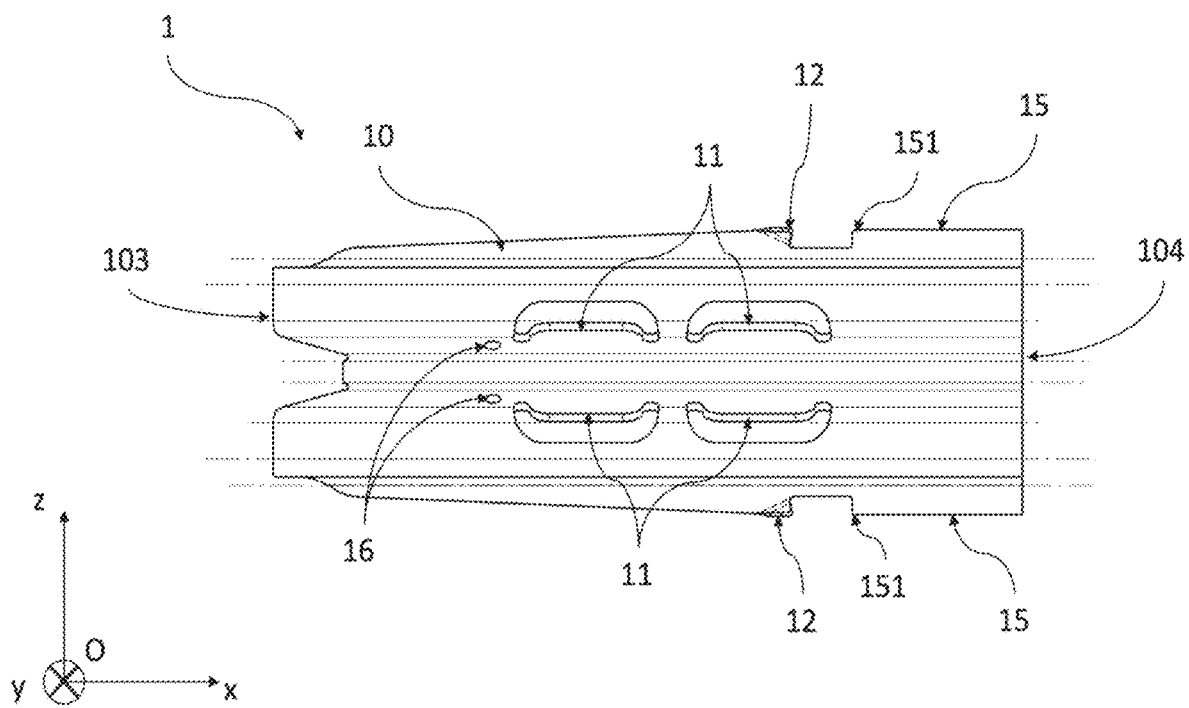

More particularly, and as can be seen in particular in FIGS. 1C and 2C, the pin 1 comprises two convex portions 13 each having an inclined inner wall 131 and an inclined outer wall 132. The inclined walls of each convex portion form a ridge 133 oriented downward and extending horizontally along the longitudinal axis (Ox). The two ridges lie in the same horizontal plane Oxz.

The cross-section of the convex portions in a plane orthogonal to the longitudinal axis (Ox) may therefore be V-shaped, as shown in FIG. 1C in particular. The ridge 133 then has a width along the transverse axis (Oz) that is small compared to the height of the inclined walls 131, 132.

Alternatively, and in a particularly advantageous manner, the ridge 133 may be U-shaped (as shown in FIG. 2C in particular), that is to say it may have a plateau that joins the inclined walls 131, 132 of the convex portion 13. In this situation, the width along the transverse axis (Oz) of the plateau is similar to the height of the inclined walls 131, 132. A configuration of this kind allows the pin 1 to have a significantly greater rigidity than if the convex portion is V-shaped.

Regardless of the shape of the convex portions 13, a concave portion connects the inner walls 131 of each convex portion 13 via a substantially flat central surface 14. This central surface 14 extends along the longitudinal axis (Ox), in the horizontal plane Oxz.

This particularly advantageous shape of the metal body 10 allows the pin 1 to be adapted well to the tolerances along the vertical axis (Oy). In particular when the body 10 is made of tempered steel, the shape of the portions 13, 14 has the advantage of being both resistant to forces along the transverse axis (Oz) and of being flexible enough to allow for compression of the pin 1.

According to a particularly advantageous configuration, each outer wall 132 can continue along the transverse axis (Oz) by means of a wing 15 that is substantially parallel to the central surface 14, that is to say in the horizontal plane Oxz.

At least one wing 15 may advantageously have a shoulder 151 projecting along the transverse axis (Oz). A shoulder of this kind, which is wider than the opening made in the rail, makes it possible to form a stop against the opening and to constitute a stopping point for the pin during insertion thereof, as will be described in more detail below.

Returning to the description of FIGS. 1A to 1D and 2A to 2D, at least one ridge 13 has on its lower face 102 a protruding blade 11 obtained by cutting and folding the metal body 10 along the longitudinal axis (Ox). As will be described in more detail below, a blade 11 of this kind is designed to scratch each element through which the pin 1 passes during insertion thereof in order to be anchored therein, making it possible both to prevent the pin 1 from sliding and to ensure that electrical contact is maintained between the pin 1 and each element.

Preferably, the pin 1 may comprise at least one protruding blade 11 on the ridge 133 of each convex portion 13.

The pin 1 may in particular comprise two protruding blades 11 aligned along the longitudinal axis (Ox) on the ridge 133 of each convex portion 13.

Alternatively, the pin 1 may comprise exactly one protruding blade 11 on the ridge 133 of each convex portion 13. In this situation, the protruding blades can be offset with respect to one another along the longitudinal axis (Ox).

In the situation where each ridge 133 has a plateau, it is advantageously possible for each protruding blade 11 to be cut in only part of the width along a transverse axis (Oz) of the plateau.

The benefit of such configurations will be described in the remainder of this description.

Whatever the configuration of the blades 11, the pin 1 also comprises at least one blocking member 12, two specific embodiments of which are described below with reference to FIGS. 1A to 1D and 2A to 2D, respectively. A blocking member 12 of this kind makes it possible to form an anti-removal stop when the pin 1 is in the assembly position.

According to a first embodiment, shown in FIGS. 1A to 1D, the blocking member 12 is formed of a projecting rib on the upper face obtained by cutting and folding the metal body 10 along the transverse axis (Oz) orthogonally to the longitudinal axis (Ox). The rib is thus open facing the second end 104.

According to a second embodiment, shown in FIGS. 2A to 2D, the blocking member 12 is formed by a lug extending outwardly along the transverse axis (Oz).

Advantageously, the lug may be slightly folded back toward the lower face 102 in order to facilitate insertion of the pin through the opening of the rail.

Whatever the embodiment of the disclosure, when the pin 1 comprises two wings 15, the pin 1 may comprise a blocking member on each wing 15. In order for each rib of blocking member 12 to be able to perform its role of a stop when the pin 1 is in the assembly position, the blocking members 12 are aligned along the transverse axis (Oz).

Using the Pin

In general, a pin 1 of this kind can be used to retain two elements 301, 311 in a U-shaped rail 20.

Figure 3:
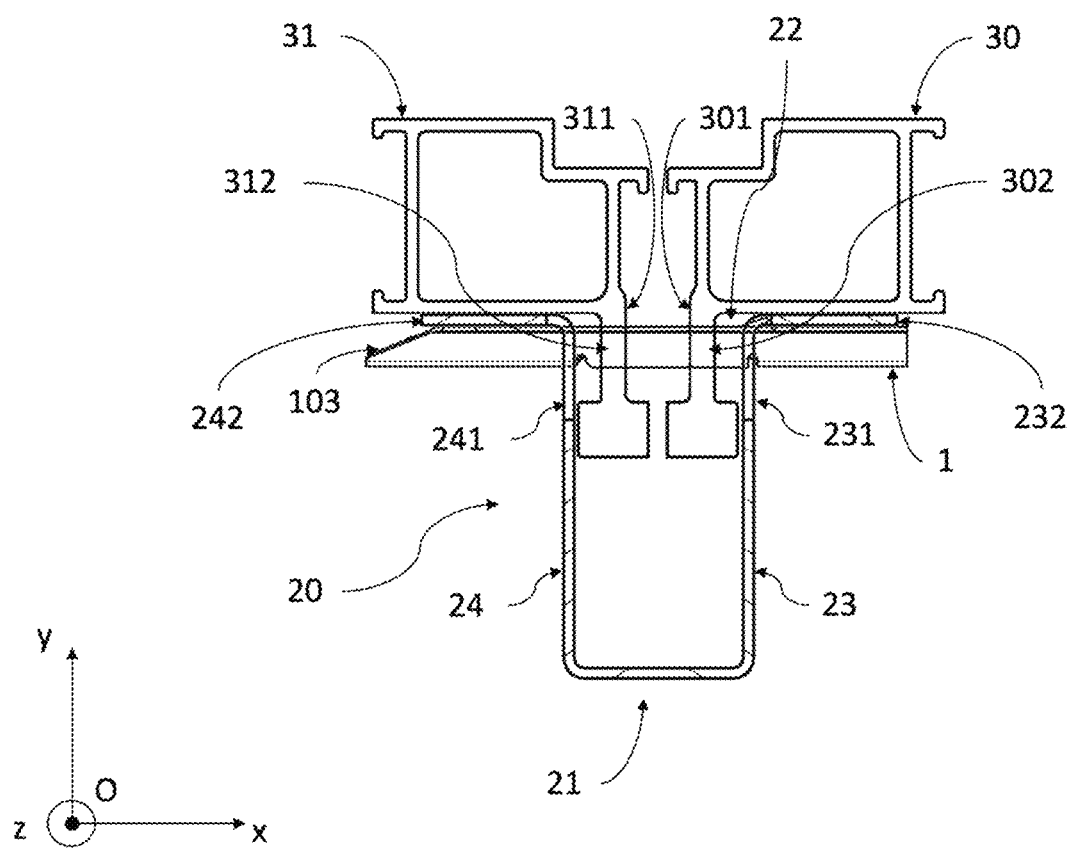
FIG. 3 shows a sectional view of an assembly using a pin according to a first embodiment of the present disclosure.

FIG. 3 shows a sectional view of an assembly using a pin 1 according to the present disclosure.

This figure shows a first and a second element 301, 311, a rail 20 and a pin 1 in the assembly position. Again, an orthogonal coordinate system Oxyz is shown, with the Oxz plane being horizontal and the axis (Ox) corresponding to the longitudinal direction of insertion of the pin 1.

The rail 20 extends along the transverse axis (Oz) and has a closed horizontal side 21, an open horizontal side 22 for receiving the planar elements 301, 311 in a retaining position, as well as two side walls 23, 24, each arranged in the Oyz plane. Each side wall 23, 24 is extended, opposite the closed side 21, by means of a horizontal wall 232, 242, which extends outwardly from the rail 20 in the Oxz plane.

Each side wall 23, 24 of the rail 20 has an opening 231, 241, which openings face one another along the longitudinal axis (Ox). As is also clearly visible in FIG. 3, each opening 231, 241 extends in part along the horizontal wall 232, 242.

Each element 301, 311 shown in FIG. 3 is a planar element of a frame 30, 31, for example made of aluminum, that secures a photovoltaic module (not shown in the figure).

Each of these elements 301, 311 has a through-passage 302, 312 along the longitudinal axis (Ox), which through-passages are located opposite the openings 231, 241 when the element 301, 311 is in the retaining position.

The retaining position is defined for the elements 301, 311 as being the position in which these elements 301, 311 are inserted into the rail 20, their frame 30, 31 resting on the horizontal walls 232, 242. Their through-passages 302, 312 are then located opposite the openings 231, 241 of the side walls 23, 24 of the rail 20.

The assembly position means the position in which the pin 1 is inserted through the openings 231, 241 and through-passages 302, 312, and the blocking member or members 12 has (have) passed through the first opening 231 through which the pin 1 has passed. The pin 1 is inserted in the rail 20 along the longitudinal insertion axis (Ox), generally in the direction of decreasing x.

During use, the pin 1 is firstly inserted by its first end 103 into the first opening 231 of the first side wall 23 of the rail 20.

Conveniently, in order to facilitate insertion of the pin, it may be easier to insert it obliquely into the first opening. To this end, and as can be seen in all of the figures, the first end 103 of the pin 1 may have a beveled shape. This beveled shape may be a bevel (as in FIG. 1B) or a chamfer (as in FIG. 2B). The bevel or chamfer is produced on the first end 103 in the direction of increasing x and increasing y, for example forming an angle of 30° or 45°. A shape of this kind makes it possible to insert the pin 1 obliquely into the first opening 231 of the rail 20, then to straighten it as it is inserted further, in order to guide the pin 1 more easily. If necessary, the pin 1 may be inserted using a hammer.

Advantageously, the pin 1 has a width along the transverse axis (Oz) that is slightly greater than that of the first opening 231, forcing the pin 1 to compress along the transverse axis (Oz) in order to allow its insertion. Compression of this kind allows the body 10 of the pin 1 to bend slightly against the rail 20 and to exert pressure thereon in order to ensure that the pin 1 is held in the rail 20 when the pin 1 is released in the assembly position.

Continuing its insertion, the first end 103 of the pin 1 then passes through the through-passages 302, 312 of the first element 301 and then of the second element 311.

The pin 1 has a height along the vertical axis (Oy) that is slightly greater than that of each through-passage 302, 312, forcing the protruding blade 11 to bend during its insertion through the through-passage 302, 312. In this way, not only will the protruding blade 11 scratch each element 301, 311 during its insertion into the through-passage 302, 312 thereof, allowing it to be anchored therein, but the blade 11 will also remain slightly bent against each element 301, 311 after insertion of the pin 1, making it possible to maintain electrical contact with the two elements 301, 311 when the pin 1 is in the assembly position.

The advantageous presence of two protruding blades 11 on the ridge 133 of each convex portion 13 of the pin 1 allows each blade of a ridge to scratch a different element when the pin 1 is in the assembly position. In this way, each blade 11 is bent independently and said bending makes it possible to optimize the maintenance of the electrical contact between each element 301, 311 and the pin 1, regardless of the movement of one or the other of the elements 301, 311.

The same advantage applies when the pin 1 comprises exactly one protruding blade 11 on the ridge 133 of each convex portion 13, with blades offset with respect to one another along the longitudinal axis (Ox). Each blade 11 will scratch a different element when the pin is in the assembly position. The Applicant has noticed that this particular configuration makes it possible to improve the rigidity of the pin 1 without compromising the functions of electrical contact and of holding the pin 1.

Finally, the advantageous feature according to which each protruding blade 11 is cut in only part of the width along a transverse axis (Oz) of the plateau makes it possible, when the pin 1 is in the assembly position, to ensure both linear contact, with the protruding blade 11, and planar contact, with the rest of the plateau, between the pin 1 and the element 301, 311, thus ensuring that forces are taken up.

Whatever the number and distribution of the blades 11, the distance between the first end 103 and the blade 11 is greater than the width of the rail 20 along the longitudinal axis (Ox), such that the first end 103 comes out of the rail 20 before the blade 11 engages in the first through-passage 302. In this way, insertion of the pin 1 is facilitated. Indeed, the desired scratching of the blade 11 against each element 301, 311 requires an additional force to insert the pin. It therefore appears preferable for the pin 1 to come out of the rail 20, thus ensuring maintenance of the assembly, before the main force for inserting the blades 11 into the through-passages 302, 312 is required.

The relative dimensions of the pin 1 and the through-passage 302, 312 make it possible, by virtue of the flexibility of the blade 11, both to insert the pin 1 through the through-passage 302, 312 without exerting too great a force on the blade 11 during insertion, and to keep the pin 1 and the elements 301, 311 rigidly connected to one another while also ensuring continuous electrical contact between them.

Indeed, even if there is a clearance between the pin 1 and one of the elements 301, 311, made necessary in order to allow insertion of the pin 1 through the through-passage 302, 312, the flexibility of the blade 11 makes it possible to ensure contact, or even to hold the element 301, 311 in a fixed position.

The pin 1 is finally inserted until the blocking member 12 has passed through the first opening 231 of the first side wall 23 of the rail 20. The pin 1 is then in the assembly position.

In the first embodiment, when the blocking member 12 is formed by a rib obtained by cutting and folding along the transverse axis (Oz), the resilience of the body 10 of the pin 1 allows the projecting rib of blocking member 12 to bend when it passes through the first opening 231 then to relax once it has passed through the first opening 231. The rib of blocking member 12 therefore acts as an anti-removal stop against the first horizontal wall 232 of the rail 20, preventing the pin 1 from being removed in the opposite direction to its insertion. The fact that the stop force of the rib of blocking member 12 against the rail 20 is exerted on the first horizontal wall 232 of the rail 20, which is at a tangent to the stop force, reinforces this stop.

In the second embodiment, when the blocking member is formed of a lug, the resilience of the body 10 of the pin 1 also allows the lug to fold slightly, in particular when the latter is slightly folded back toward the lower part, when it passes through the first opening 231. Once the lug has passed through the first opening 231, it acts as an anti-removal stop against the first side wall 23 of the rail 20, preventing the pin from being removed in the opposite direction to its insertion.

The advantageous presence of a shoulder 151, which allows the pin 1 to have a greater width than the first opening 231 at the level of the shoulder even when the pin is compressed along the transverse axis (Oz), makes it possible to prevent disengagement of the pin 1 if it slides along the longitudinal axis (Ox) in the direction of decreasing x.

The shoulder 151 may also constitute a stop point for the insertion of the pin 1, indicating that the pin 1 is indeed in the assembly position. For this purpose, the shoulder 151 is located between the second end 104 and the blocking member or members 12. In this way, during the insertion of the pin 1, the blocking member 12 passes through the first opening 231 before the shoulder 151 comes to form a stop against the first side wall 23 of the rail 20.

As a result, when it is in the assembly position, the pin 1 is prevented from sliding in both directions along the longitudinal axis (Ox).

Preferably, in order to avoid any play along the longitudinal axis (Ox) when the pin 1 is in the assembly position, the distance between the blocking member 12 and the shoulder 151 is equal to, or very slightly greater than, the thickness of the first side wall 23.

To prevent disengagement of the pin along the longitudinal axis (Ox), the pin 1 may alternatively or additionally comprise a non-return notch (not shown in the figures), which may be defined by a base, which receives the edge of the first opening 231, and of two stops which limit the movement of said edge. But the present disclosure is in no way limited to a notch of this kind, and may include any means allowing insertion of the pin up to the assembly position and preventing its disengagement. Said non-return notch may be provided on the lower face 102 or on the upper face 101. Preferably, the non-return notch is provided as close as possible to the second end, preferably between the blade 11 and the second end 104 along the longitudinal axis (Ox), in order to limit the number of elements that the notch must pass through during insertion of the pin 1, which necessarily increases the force required to insert the pin 1.

In cases where the elements 301, 311 would be subjected to a tensile force that would tend to pull them out of the rail 20 by the open horizontal side 22, that is to say along the vertical axis (Oy) in the direction of increasing y, their movement would be limited to their play by means of the pin 1, the pin 1 in the assembly position keeping them secured. The pin 1 remains blocked along the vertical axis (Oy) by means of abutment against the side walls 23, 24 of the rail 20. When the pull-out force is exerted on the elements 301, 311, the flexibility of the blade 11 ensures, on account of its slackening, that the electrical contact between the elements 301, 311 and the pin 1 is maintained.

The electrical contact between the pin 1 and the rail 20 is for its part ensured by the compression of the pin 1 in the first opening 231 of the rail 20, as well as by its contact with the first horizontal wall 232 of the rail 20. Such contact can be either continuous (as in FIG. 3), which is preferable, or ensured by means of the pin 1 abutting against this second side wall 24 when the frames 30 are pulled out.

With regard to the compression of the elements 301, 311, that is to say the application of a force along the vertical axis (Oy), in the direction of decreasing y, and as is clearly visible in FIG. 3, the frames 30, 31 rest directly on the rail 20 in the retaining position. They therefore cannot exert a greater compression force on the pin 1 than the compression described above due to the play between the elements 301, 311 and the pin 1.

A pin 1 according to the present disclosure therefore makes it possible to secure two elements 301, 311 to a rail 20 in a simple and robust manner, while ensuring continuous electrical contact between each element 301, 311 and the rail 20 without it being possible for this electrical contact to be interrupted, regardless of the intensity and duration of the tensile forces exerted on the elements 301, 311.

Of course, the disclosure is not limited to the embodiments described and it is possible to add variants without departing from the scope of the invention as defined by the claims.

In particular, although only retaining members obtained in an integral manner simply by cutting and folding the metal body have been described, it is possible to envisage any other retaining member that makes it possible to prevent removal of the pin once it is in the assembly position.

It is in particular possible to envisage that each wall has a hole 16, which holes face one another along the transverse axis (Oz), as shown in FIGS. 2A to 2D. The holes 16 are in this case arranged between the first end 103 and the protruding blade 11. The blocking member 12 may in this case comprise, in addition to or instead of the integral blocking members described above, an external blocking member, comprising a rod capable of passing through all of the holes 16. For example, the external blocking member may be a beta pin (not shown).

In this situation, the use of the pin is slightly different. The assembly position is no longer defined when the blocking member has passed through the first opening 231 of the first side wall 23 of the rail 20, but when the holes 16 have passed through the second opening 241 of the second side wall 24 of the rail 20, the protruding blade 11 having passed through the first opening 231. The external blocking member 12 is then inserted into the holes 16 in order to prevent removal of the pin 1.

What is claimed is:

1. A pin, comprising:
 a metal body extending along a longitudinal insertion axis and having a first and a second end along the longitudinal insertion axis, an upper face and a lower face opposite the upper face;
 two convex portions each defined by an inclined inner wall and an inclined outer wall, the inclined walls of each convex portion joining together to form a ridge extending along the longitudinal insertion axis, at least one ridge of the two convex portions having on its lower face a protruding blade obtained by cutting and folding the metal body along the longitudinal insertion axis;
 a concave portion connecting the inner wall of each convex portion via a central surface; and
 at least one blocking member;
 wherein each inclined outer wall extends along a transverse axis, perpendicular to the longitudinal insertion axis, to define a wing presenting a surface parallel to the central surface.

2. The pin of claim 1, wherein at least one of the wings of the inclined outer walls has a shoulder along the transverse axis, the shoulder being located between the second end and the at least one blocking member.

3. The pin of claim 1, wherein the at least one blocking member is formed by a projecting rib on the upper face, obtained by cutting and folding the metal body along a transverse axis.

4. The pin of claim 1, wherein the at least one blocking member is defined by a lug extending outwardly along a transverse axis.

5. The pin of claim 4, wherein the lug is folded back toward the lower face.

6. The pin of claim 1, wherein the at least one of blocking member comprises two blocking members, wherein one of the two blocking members is respectively disposed on each of the wings, the two blocking members being aligned on the transverse axis.

7. The pin of claim 1, further comprising at least one protruding blade on the ridge of each convex portion.

8. The pin of claim 7, further comprising two protruding blades aligned along the longitudinal insertion axis on the ridge of each convex portion.

9. The pin of claim 7, further comprising exactly one protruding blade on the ridge of each convex portion, the protruding blades being offset with respect to one another along the longitudinal insertion axis.

10. The pin of claim 7, wherein each ridge has a plateau, each protruding blade being cut in only part of the width along a transverse axis of the plateau.

11. The pin of claim 1, wherein the first end has a beveled shape.

12. The pin of claim 1, wherein the metal body comprises tempered steel.

13. The pin of claim 1, wherein each wall has a hole, wherein the holes face one another along a transverse axis and are arranged between the first end and the at least one protruding blade, the at least one blocking member comprising a rod capable of passing through all the holes.

14. A method of retaining two elements in a U-shaped rail that extends along a transverse axis, the rail having a closed horizontal side, an open horizontal side for receiving the elements in a retaining position and two side walls that are extended opposite the closed horizontal side by a horizontal wall extending outward from the rail along a rail longitudinal axis, each side wall having an opening, the openings facing one another along the rail longitudinal axis and extending at least in part along the horizontal wall, each element having a through-passage located opposite the openings when the elements are in the retaining position, the method comprising:
 providing a pin including:
 a metal body extending along a longitudinal insertion axis and having a first and a second end along the longitudinal insertion axis, an upper face and a lower face opposite the upper face;
 two convex portions each having an inclined inner wall and an inclined outer wall, the inclined walls of each convex portion forming a ridge and extending along the longitudinal insertion axis, at least one of the ridges of the two convex portions having on its lower face a protruding blade obtained by cutting and folding the metal body along the longitudinal insertion axis;
 a concave portion connecting the inner wall of each convex portion via a central surface; and
 at least one blocking member; and inserting the pin in the openings and through-passages along the longitudinal insertion axis into an assembly position in which the protruding blade and the at least one blocking member have passed through one of the openings of the rail, the protruding blade coming into forced contact with the elements, the at least one blocking member forming a stop against the rail to prevent removal of the pin.

* * * * *